Patented June 7, 1932

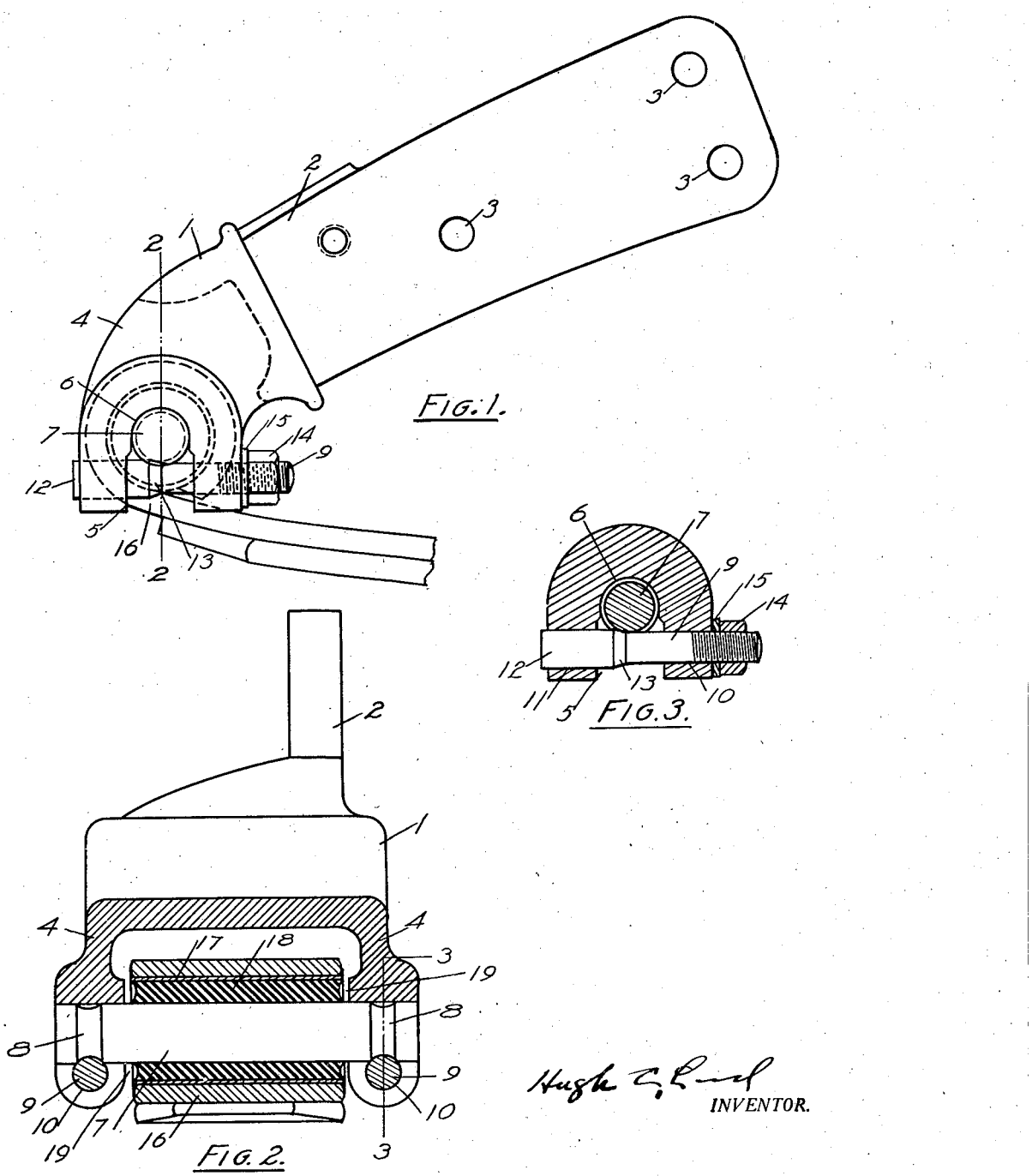

1,862,027

UNITED STATES PATENT OFFICE

HUGH C. LORD, OF ERIE, PENNSYLVANIA

JOINT

Application filed March 1, 1929. Serial No. 343,740.

This invention is designed to improve joint constructions and is particularly applicable for securing spring joints in brackets or automobiles and is so exemplified. In its broader aspects, however, it is adapted to other uses.

The invention is also particularly applicable in securing rubber joints for the springs of automobiles, particularly where it is desirable to have these joints in a neutral position with relation to the movement of the joint under the stress of a pre-determined load, as the body load of the vehicle. The joint is particularly advantageous in that it may be quickly assembled, makes the joint connection very secure and is simple and convenient to manufacture and is particularly rugged in comparison with its weight.

Features and details of the invention will appear from the specification and claims.

A preferred embodiment of the invention is illustrated in the accompanying drawing as follows:—

Fig. 1 shows a side elevation of the joint.
Fig. 2 a section on the line 2—2 in Fig. 1.
Fig. 3 a section on the line 3—3 in Fig. 2.

1 marks the bracket. This has a pad 2 extending from it, as shown adapted to secure the bracket to the front of the frame of an automobile. The pad has the ordinary perforations 3 for this purpose. The bracket is provided with the side walls 4 and these side walls have slots 5 extending from the lower edges of the side walls. The slots terminate in pin seats 6, the slots being slightly wider than the greatest width of the seats.

A joint pin 7 extends from wall to wall of the bracket. It is preferably provided with annular locking grooves 8. Cross pins 9 extend across the slot and crosswise of the pin. This cross pin extends through openings 10 and 11 in the walls of the bracket, the perforation 10 being slightly larger than 11 to accommodate an enlarged end 12 of the cross pin 9. A conical, or wedging surface 13 is arranged at the end of the enlargement 12 and this wedging surface is adapted to engage the joint pin when the cross pin is drawn in.
A nut 14 operates on the end of the pin 12 and is provided with a lock washer 15 for locking it in its set position.

The joint pin 7 in the joint shown forms the inner member of a joint member comprising a rubber bushing 18, and shell 17, the shell being pressed in a spring eye 16. Preferably the rubber is bonded to the shell and to the pin and there is a slight clearance 19 between the end of the joint and the walls of the bracket.

It is desirable that the rubber forming the joint be relieved of stress as the weight of the car body initially depresses the spring. In setting the joint, therefore, it is desirable to put this weight upon the joint and release the joint pin of frictional engagement so that the joint may find its relieved position. This bracket construction for engaging the joint pin is particularly desirable in this respect in that the joint pin may be readily observed so that the relieving of the stress in the rubber may be accomplished.

It is also desirable to tie the walls of the bracket together so that the thrusts may be sustained by both of them. The groove in the joint pin is engaged by the cross pin 9 and thus securely locks the ends of the joint pin and in consequence directly unites, or connects the side walls of the bracket. This locking of the pin also assures the holding of the joint in such position as to maintain the clearance 19.

The wedging action of the pin locks the pin against turning so that the nut may be readily secured on the pin without a wrench-hold or locking means for holding the pin as the nut is set to place.

While I have shown a rubber joint member, it will be understood that any scheme of joint may form the joint member as a whole from which the pin extends and I do not wish, therefore, except as expressed in the claims to be limited to this particular form of joint member.

What I claim as new is:—

1. In a joint, the combination of a joint member comprising a joint pin extending axially from the member; a support having an open slot terminating in a seat for receiving the joint pin, said slot extending to the edge of the support with a width equal to the diameter of the joint pin and adapted to receive the joint pin by a crosswise movement of the joint pin; and a cross pin bridging and closing the slot engaging the joint pin and locking it on its seat and against turning, said cross pin connecting the walls at the sides of the slot.

2. In a joint, the combination of a joint member comprising a joint pin extending axially from the member; a support having an open slot extending inwardly from the edge thereof and terminating in a seat receiving a joint pin, said slot having a width extending to the edge of the support equal to the diameter of the joint pin and adapted to receive the joint pin by a crosswise movement of the joint pin; a cross pin bridging and closing the slot engaging the joint pin and locking the joint pin on the seat and against turning, said pin connecting the walls at the sides of the slot; and means locking the pin against edgewise movement.

3. In a joint, the combination of a joint member having a joint pin, said joint pin having its ends extending axially therefrom; a bracket having side walls, said side walls having open slots extending from the edges of the walls with joint pin receiving seats in the slots, said slots having widths extending to the edge of the support equal to the diameter of the joint pin and adapted to receive the joint pin by a crosswise movement of the joint pin; and cross pins in the walls bridging and closing the slots and engaging the joint pins to lock them on their seats and against turning, said pins connecting the walls at the sides of the slots.

4. In a joint, the combination of a joint member having a joint pin, said joint pin having its ends extending axially therefrom; a bracket having side walls, said side walls having open slots extending from the edges of the walls with joint pin receiving seats in the slots, said slots having widths extending to the edge of the support equal to the diameter of the joint pin and adapted to receive the joint pin by a crosswise movement of the joint pin; cross pins in the walls bridging and closing the slots and engaging the joint pins to lock them on their seats and against turning, said pins connecting the walls at the sides of the slots; and means acting through the joint pins locking the side walls against spreading.

In testimony whereof I have hereunto set my hand.

HUGH C. LORD.